(12) United States Patent
Lessard (10) Patent No.: US 7,272,972 B2
(45) Date of Patent: Sep. 25, 2007

(54) METHOD AND APPARATUS FOR MEASURING A THICKNESS OF A THIN FILM IN MOTION

(75) Inventor: Dave Lessard, Montreal (CA)

(73) Assignee: Avestor Limited Partnership, Boucherville (CA)

( * ) Notice: Subject to any disclaimer, the term of this patent is extended or adjusted under 35 U.S.C. 154(b) by 110 days.

(21) Appl. No.: 11/165,523

(22) Filed: Jun. 24, 2005

(65) Prior Publication Data

US 2006/0288771 A1    Dec. 28, 2006

(51) Int. Cl.
*G01L 5/04*    (2006.01)
(52) U.S. Cl. ........................................ 73/159; 73/865.8
(58) Field of Classification Search .................. 73/159
See application file for complete search history.

(56) References Cited

U.S. PATENT DOCUMENTS

| | | | | |
|---|---|---|---|---|
| 3,258,686 A | * | 6/1966 | Selgin | 324/230 |
| 4,078,416 A | * | 3/1978 | Voorhees et al. | 72/419 |
| 4,671,663 A | * | 6/1987 | Sick | 356/430 |
| 4,682,105 A | * | 7/1987 | Thorn | 324/230 |
| 4,881,415 A | * | 11/1989 | Hergeth | 73/865.8 |
| 5,047,652 A | * | 9/1991 | Lisnyansky et al. | 250/559.01 |
| 5,233,727 A | * | 8/1993 | Baechler | 19/300 |
| 5,606,509 A | * | 2/1997 | Denz et al. | 700/143 |
| 5,623,850 A | * | 4/1997 | Szczepaniak et al. | 73/159 |
| 5,743,521 A | * | 4/1998 | Munakata et al. | 271/263 |
| 6,152,720 A | * | 11/2000 | Greb et al. | 425/147 |

* cited by examiner

*Primary Examiner*—Edward Lefkowitz
*Assistant Examiner*—Freddie Kirkland, III
(74) *Attorney, Agent, or Firm*—Osler, Hoskin & Harcourt LLP (57) ABSTRACT

An apparatus for monitoring a thickness of a film in motion. The apparatus comprises a roller for receiving and supporting the film in motion, the roller being adapted to rotate about an axis of rotation. The apparatus also comprises a position detector for detecting when the roller is in a specific angular position as the roller rotates about the axis of rotation. The apparatus further comprises a measurement unit aligned with a specific portion of the roller and coupled to the position detector. The measurement unit is responsive to a detection of the roller being in the specific angular position to measure the thickness of the film.

18 Claims, 6 Drawing Sheets

METHOD AND APPARATUS FOR MEASURING A THICKNESS OF A THIN FILM IN MOTION

FIELD OF THE INVENTION

The present invention relates generally to measurement of a thickness of a thin film and, more particularly, to a method and an apparatus for continuous measurement of a thickness of a thin film component for use in thin film lithium based electrochemical generators.

BACKGROUND

Rechargeable electrochemical generators manufactured from thin film laminates of electrolytes and sheet-like anodes and cathodes display many advantages over conventional electrochemical generators. These advantages include lower overall battery weight, high power density, high specific energy, and longer service life.

Components of a lithium polymer electrochemical cell include a positive electrode, a negative electrode, and a separator capable of permitting ionic conductivity such as a solid polymer electrolyte sandwiched between the negative electrode and the positive electrode. The negative electrode, or anode, and the positive electrode, or cathode, are made of material capable of reversible insertion of alkali metal ions. The polymer electrolyte separator electrically isolates the anode from the cathode to prevent short-circuits between the anode and the cathode which would render the electrochemical cell useless.

The cathode is typically formed of a mixture of active material capable of occluding and releasing lithium such as transitional metal oxides or phosphates, an electronically conductive filler, usually carbon or graphite or combinations thereof, and an ionically conductive polymer binder. Cathode materials are usually paste-like materials and require a current collector, which may be a thin sheet of electrically conductive material such as an aluminum foil or an electrically conductive grid. The anode is typically made of light-weight metal foils, such as alkali metals and alloys typically lithium metal, lithium oxide, lithium-aluminum alloys and the like, but may also be made of composite paste-like material comprising, for example, carbon based intercalation compounds in a polymer binder, in which case the anode also requires a current collector support such as a copper foil or grid. Composite cathode thin films are usually obtained by solvent coating onto a current collector or by melt extrusion. Similarly, the polymer electrolyte separator layer is typically produced by solvent coating or by melt extrusion. The thin film components are often manufactured in continuous lengths (L>1000 meters) of fixed width and thereafter cut to specific lengths for assembly.

A lithium polymer electrochemical cell is manufactured by successive layering of the positive electrode, the electrolyte separator, and the negative electrode. The positive electrode material is initially coated or extruded onto a metallic foil (for example aluminum) or on a metallized plastic film which serves as a current collector. The polymer electrolyte separator is thereafter directly coated or extruded onto the previously-coated cathode material or may be laminated thereon after having been formed into a thin film. The negative electrode is finally laminated onto the electrolyte separator to form an electrochemical cell. To increase the energy density of an electrochemical cell, a bi-face configuration is often used, wherein positive electrode material is laminated, coated, or extruded onto both sides of the current collector and thereafter an electrolyte separator and a negative electrode are laminated onto each positive electrode layer to form a bi-face electrochemical cell. Electrochemical cells as previously described are thereafter stacked or wound into an electrochemical cells assembly having a specific number of cells.

For the electrochemical cells assembly to perform well and have the required life expectancy, the thickness of the thin film components which make up the electrochemical cells must be as uniform and consistent as possible. To ensure this uniformity and consistency, the thickness of the thin film components should be continuously measured as they are produced in order to maintain the thickness of the thin film within its tolerance requirements. Thin film components for electrochemical cells are extremely thin. For example, the thickness of the electrolyte separator may range from 10 μm to 30 μm with a tolerance of ±3 μm, protective layers on an aluminum foil current collector may be as thin as 2.5 μm ±1 μm, whereas the thickness of cathode films may range from 40 μm to 100 μm ±4 μm. Because of these extremely small thicknesses and the high precision required by tight tolerances, it is difficult to reliably measure the thickness of these thin film components on a continuous basis to ensure quality of the end products. The difficulties are compounded by the fact that the thin film components have variations in color, transparencies and surface roughness and therefore optical reflection techniques are not adapted for these specific films.

Some existing systems are able to precisely measure the thickness of samples of thin film held stationary using a variety of methods such as spectroscopy, electron beam, interferometry, wavelength transmitted through or reflected from a thin film, spectral imaging ellipsometry, X-rays, material density measurements with calculated extrapolation of thickness, etc. However, these systems by themselves are unable to achieve high precision when required to measure the thickness or thickness profile of a moving thin film in a production environment. Some existing systems can measure the thickness of a moving thin film in a production environment but are plagued with limited accuracy due to the constrains of the production environment. Thickness measurement systems have been devised to control the average or mean thickness of a thin film being produced but these are obviously unable to provide an accurate portrait of the thin film being produced and are unable to attain sub-micron precision.

There is thus a need for a method and an apparatus for accurately measuring the thickness of thin film components on a continuous basis in order to monitor the quality of such films in the production environment of electrochemical cell components manufacturing and assembly of electrochemical generators.

SUMMARY OF THE INVENTION

In accordance with a first broad aspect, the invention seeks to provide an apparatus for monitoring a thickness of a film in motion. The apparatus comprises a roller for receiving and supporting the film in motion, the roller being adapted to rotate about an axis of rotation. The apparatus also comprises a position detector for detecting when the roller is in a specific angular position as the roller rotates about the axis of rotation. The apparatus further comprises a measurement unit aligned with a specific portion of the roller and coupled to the position detector. The measurement unit is responsive to a detection of the roller being in the specific angular position to measure the thickness of the film.

In accordance with a second broad aspect, the invention seeks to provide a method for monitoring a thickness of a film in motion. The method comprises:

receiving and supporting the film in motion on a roller adapted to rotate about an axis of rotation;

detecting when the roller is in a specific angular position as the roller rotates about the axis of rotation; and using a measurement unit aligned with a specific portion of the roller to measure the thickness of the film responsive to a detection of the roller being in the specific angular position.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of an embodiment of the present invention is provided herein below, by way of example only, with reference to the accompanying drawings, in which.

In the drawings, embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF EMBODIMENTS

FIGS. 1 to 4 show a perspective view of an apparatus 12 for measuring a thickness of a thin film band 10 traveling through the apparatus 12, in accordance with a non-limiting embodiment of the invention. The apparatus 12 comprises a base 14 to which are anchored a pair of rails 16 disposed on each side of the base 14 and extending its entire length. The apparatus also comprises a support element 15 movable transversely to the direction of motion of the thin film band 10. In this particular case, the support element 15 is movable substantially perpendicularly to the direction of motion of the thin film band 10. The support element 15 comprises a first part 18 and a second part 24.

In this specific embodiment, the first part 18 is a mobile platform that is securely mounted to the rails 16 via four slide bearings 20 located at corners of the mobile platform 18. The mobile platform 18 is adapted to move back and forth over the rails 16. In this non-limiting embodiment, the motion of the mobile platform 18 is imparted and controlled by a step motor 21 mounted to the base 14 and operative to drive an endless screw 22 engaged with a threaded coupling 23 attached to a lower portion of the mobile platform 18. In other embodiments, the motion of the mobile platform 18 may be imparted and controlled by any other type of actuators known to those skilled in the art. A stopper 17 is positioned at both ends of each rail 16 (omitted in FIG. 4 for clarity) to ensure that the mobile platform 18 remains on its predetermined path.

In the particular embodiment shown in FIGS. 1 to 4, the second part 24 is a swiveling platform that is pivotally coupled to the mobile platform 18 via a conical bearing 26 and optionally a pin 28 located at an axis of rotation 30 of the swiveling platform 24. The conical bearing 26 allows the swiveling platform 24 to pivot about the axis of rotation 30 relative to the mobile platform 18. The swiveling platform 24 may be mounted to the mobile platform 18 by any other means known to those skilled in the art to pivot about the axis of rotation 30. A pair of stoppers 25 each comprising a bracket 29 secured to the mobile platform 18 and an adjustment screw 27 are provided to set the boundaries of the angular rotation of the swiveling platform 24 relative to the mobile platform 18.

In this specific embodiment, the rotational movement of the swiveling platform 24 is imparted by a pneumatic twin piston-cylinder assembly 31 located at one end of the mobile platform 18. The twin cylinder portion of the piston-cylinder assembly 31 is secured to the mobile platform 18 and the ends of the two piston shafts are connected to the side of the swiveling platform 24. The twin piston-cylinder assembly 31 is an assembly of two opposing piston cylinders, each having its air inlet. This assembly can therefore assume three positions: neutral, wherein pressurized air is introduced into both piston-cylinders such that the right piston is retracted and the left piston is extended; left, wherein pressurized air is introduced into both piston-cylinders such that the right piston and the left piston are extended; and right, wherein pressurized air is introduced into both piston-cylinders such that the right piston is retracted and the left piston is retracted. When pressurized air is introduced into the piston-cylinders of the twin piston-cylinder assembly 31, the piston shafts are activated thereby moving the swiveling platform 24 about its rotational axis 30. The limit angular position of the rotational movement imparted to the swiveling platform 24 by the twin piston-cylinder assembly 31 is defined by one of the stoppers 25 depending on whether the rotational movement of the swiveling platform 24 is clockwise or counterclockwise relative to the mobile platform 18. While the embodiment shown in FIGS. 1 to 4 uses a piston-cylinder assembly to impart movement to the swiveling platform 24, it is to be understood that, in other embodiments, the rotational motion of the swiveling platform 24 about its rotational axis 30 may be imparted by various other types of actuators known to those skilled in the art such as piston-cylinder assemblies, electromagnetic actuators, linear displacement devices, etc.

A pair of supporting beams 34 are secured to the swiveling platform 24 at its four corners. Vibration absorbing elements 36, in this case, cushions, are used to isolate components of the apparatus 12 mounted onto the supporting beams 34, and especially the measuring components, from vibrations coming from the surrounding environment through the base 14, or vibrations produced by various movements and/or actuators of the mobile platform 18 and of the swiveling platform 24.

The apparatus 12 also comprises a cylindrical roller 40 supported at both ends by roller bearings 33 (FIG. 4) mounted on a pair of supporting pillars 38, themselves mounted onto the supporting beams 34. The cylindrical roller 40 is adapted to rotate about an axis of rotation 41. A bridge portion 42 is secured on four posts 44 also mounted onto the supporting beams 34 as illustrated. The bridge portion 42 comprises a pair of extension arms 46 and 48 extending perpendicular to a central portion of the bridge portion 42 in both directions.

Figure 1:
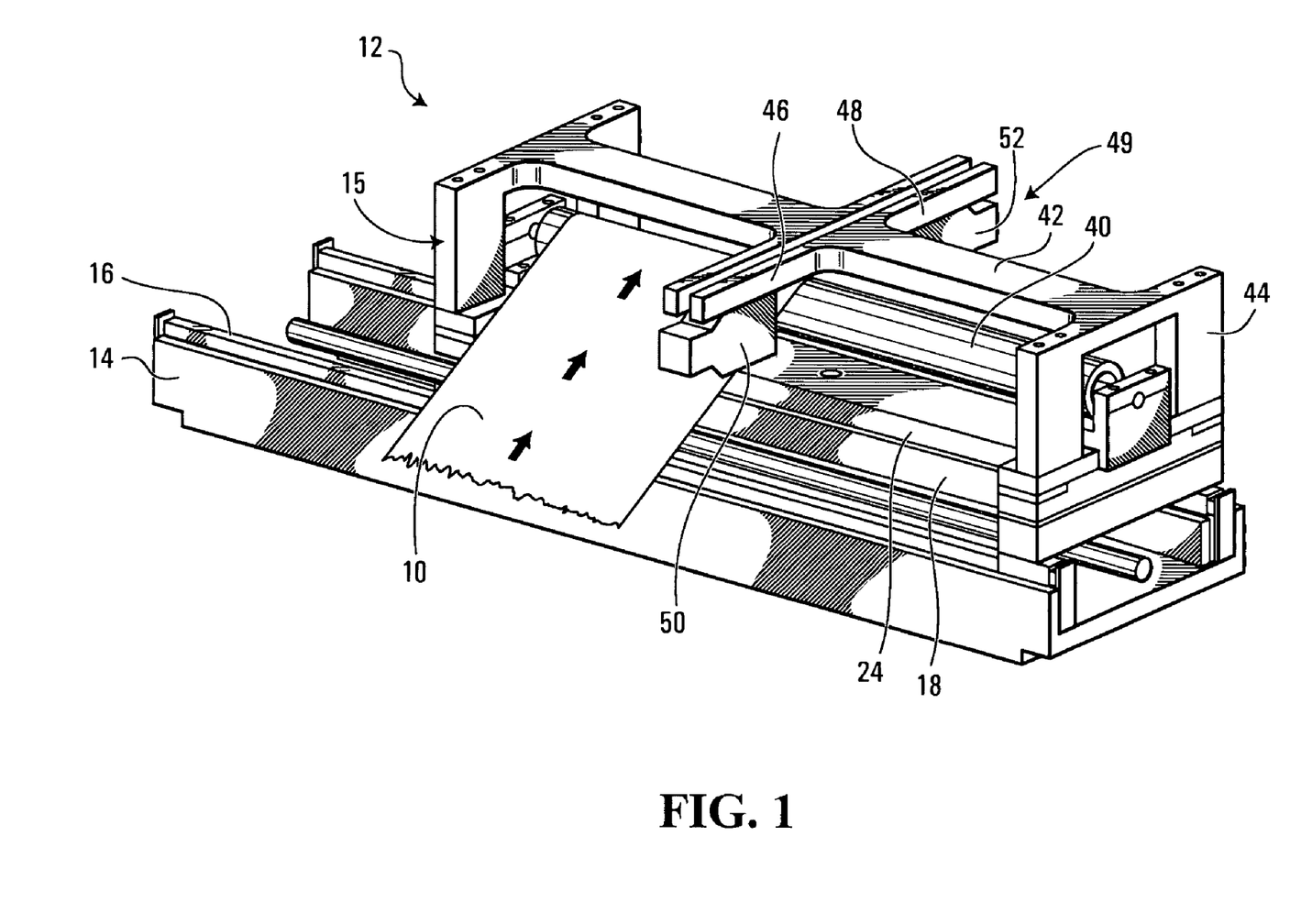
FIG. 1 is a schematic perspective view of an apparatus for measuring the thickness of a thin film according to a non-limiting embodiment of the invention.
Figure 2:
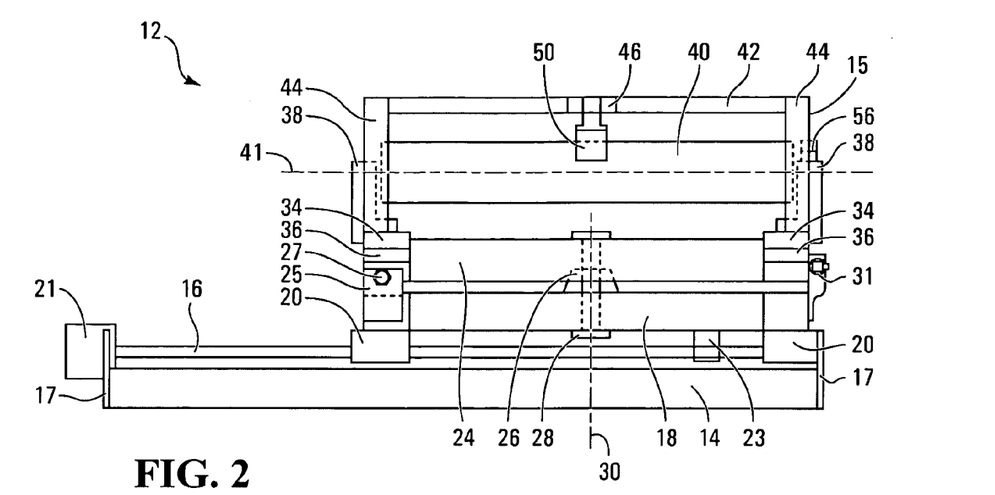
FIG. 2 is a front elevational view of the apparatus for measuring the thickness of a thin film shown in FIG. 1.
Figure 3:
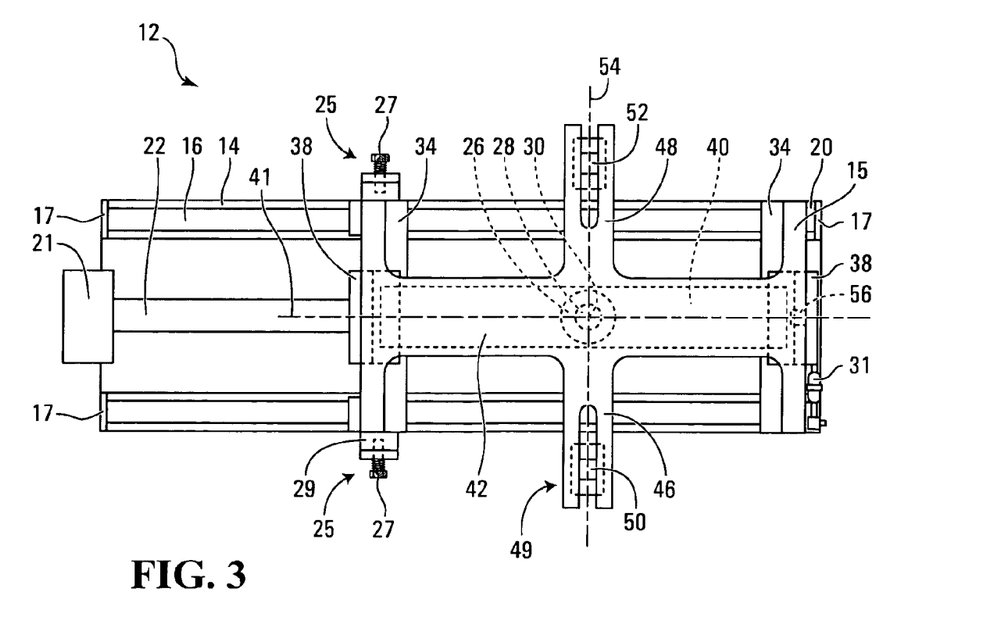
FIG. 3 is a top plan view of the apparatus for measuring the thickness of a thin film shown in FIG. 1.
Figure 4:
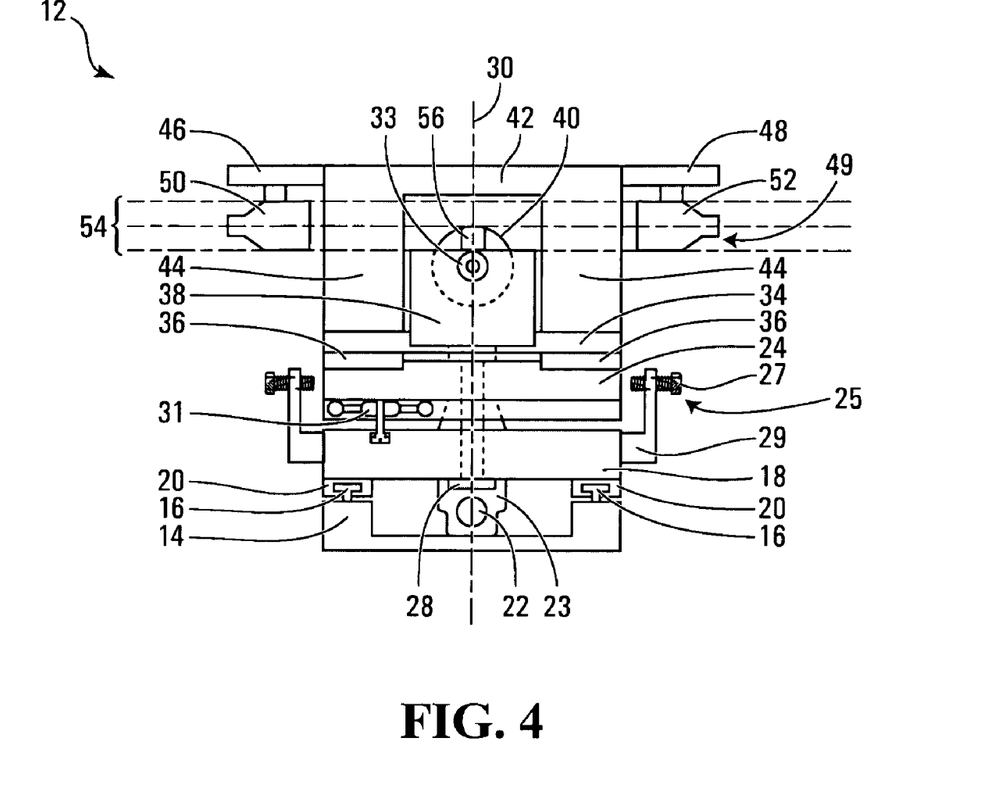
FIG. 4 is a side elevational view of the apparatus for measuring the thickness of a thin film shown in FIG. 1.

The apparatus 12 further comprises a measurement unit 49 mounted to the support element 15 and aligned with a specific portion of the cylindrical roller 40. The measurement unit 49 is operative to measure the thickness of the thin film band 10. In this non-limiting embodiment, the measurement unit 49 is operative to optically measure the thickness of the thin film band 10. In this particular case, the measurement unit 49 comprises a light emitter 50 secured underneath the extension arm 46 and a light detector 52 secured underneath the extension arm 48. The respective centers of the light emitter 50 and the light detector 52 are aligned together to define a measuring plane 54, the center line of which is tangential to the surface of the cylindrical roller 40, as best seen in FIG. 4. For convenience, the combination of the light emitter 50 and the light detector 52 is hereinafter referred to as a digital micrometer 50-52. Since the light emitter 50, the light detector 52, and the cylindrical roller 40 are all mounted onto structural elements of the apparatus 12 which are fixed relative to each other, the measuring plane 54 of the digital micrometer 50-52 is set at a fixed position along the length of the cylindrical roller 40.

A position detector 56 is coupled to the support element 15 and is operative to detect when the cylindrical roller 40 is in a specific angular position as the cylindrical roller 40 rotates about the axis of rotation 41. As further described below, the measurement unit 49 is responsive to a detection of the cylindrical roller 40 being in the specific angular position to measure the thickness of the thin film band 10. In this non-limiting embodiment, the position detector 56 is implemented as an electronic optical device mounted on one of the supporting pillars 38 and aimed at the circumference of one end of the cylindrical roller 40. In this particular case, the cylindrical roller 40 has a detectable mark on the circumference of the end of the cylindrical roller 40, the mark indicating a reference line on the surface of the cylindrical roller 40. The electronic optical device 56 is adapted to optically detect the detectable mark. Thus, the electronic optical device 56 detects that the cylindrical roller 40 is in the specific angular position each time it optically detects the detectable mark. It will be appreciated that many other implementations of the position detector 56 are possible without departing from the scope of the invention. For instance, the position detector 56 may be any type of proximity switch.

The intersection of the measuring plane 54 and the reference line on the surface of the cylindrical roller 40 defines a reference point of measurement. The 'reference point' herein refers to a small area at a specific location. Aligning the centers of the light emitter 50 and the light detector 52 to the fixed reference point of measurement enables utilization of the higher degree of precision of the digital micrometer 50-52 at the central portion of the measuring plane 54, as indeed the digital micrometer 50-52 is more precise in its central or middle portion than over the entire width of the measuring plane 54 it defines.

While in the non-limiting embodiment shown in FIGS. 1 to 4 the measurement unit 49 is based on optics, it will be appreciated that, in other embodiments, various other types of measuring devices may be used depending on the precision requirements, such as any light or laser measuring devices or even mechanical micrometers for less precise measurement requirements.

In operation, the apparatus 12 is initialized by calibrating the digital micrometer 50-52 with the reference point of measurement on the surface of the cylindrical roller 40. The digital micrometer 50-52 sets its 'zero' at the reference point of measurement on the surface of the cylindrical roller 40 previously defined. Because no cylinder is perfectly cylindrical or perfectly concentric, the 'zero' of the digital micrometer 50-52 is set at a single point on the surface of the cylindrical roller 40 to ensure that it remains constant and does not vary with the imperfections of the cylindrical roller 40 or other imperfections due to alignment, for example. When the thickness of the film 10 must be within extremely small tolerances in the range of ±2 to 5 μm, a single reference point or 'zero' on the surface of the cylindrical roller 40 eliminates the other variations or tolerances inherent with the cylinder fabrication and assembly onto the apparatus 12 and a high degree of precision may be obtained in the thickness measurement. Thereafter, a thickness measurement will refer to the distance between the reference point of measurement on the surface of the cylindrical roller 40 and the surface of the film band 10 traveling onto the cylindrical roller 40 within the measuring plane 54 (the surface being the surface of the film band 10 that is not in contact with the cylindrical roller 40).

Figure 5:
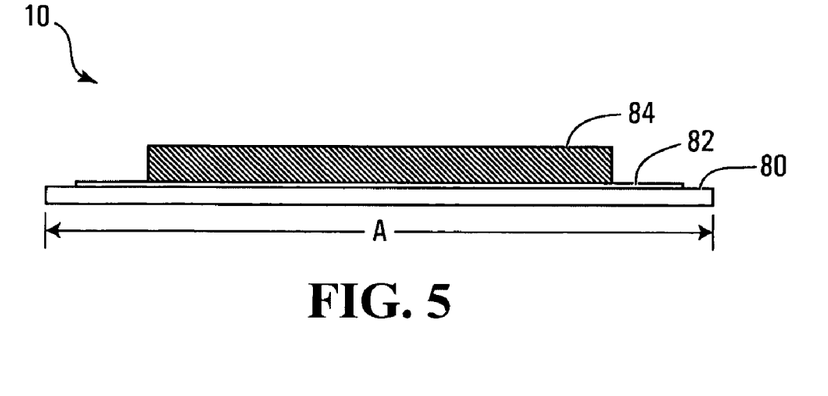
FIG. 5 is a schematic cross-sectional view of one type of thin film for which the measuring apparatus is designed.

FIG. 5 is a schematic cross-sectional view of one non-limiting embodiment of the thin film band 10. In this specific embodiment, the thin film band 10 comprises an aluminum foil 80 approximately 20 μm thick having a protective layer of conductive material 82 and a layer of a composite electrode material 84 approximately 50 μm, for a total thickness of approximately 70 μm. As previously mentioned, an aim of measuring the thickness of the thin film band 10 is to verify that the overall thickness of the thin film band 10 is within specific tolerances, but also to verify and control that the layer of a composite electrode material 84 is spread evenly over width 'A' of the aluminum foil 80 and does not feature an irregular profile or is not thicker or thinner in different areas along its width. To achieve this kind of verification and control, the digital micrometer 50-52 repeatedly scan the entire width of the thin film band 10.

Referring back to FIG. 1, the thin film band 10 enters and exits the apparatus 12 at angles designed to clear the light emitter 50 and the light detector 52. As it travels through the apparatus 12, the thin film band 10 is supported by the cylindrical roller 40 and transmits a rotational motion to the cylindrical roller 40 through friction forces at the interface between the thin film band 10 and the cylindrical roller 40, which rotates at a tangential speed corresponding to the speed of the thin film band 10. The digital micrometer 50-52 and the electronic optical device 56 are linked to an electronic control and data acquisition system (not shown) such as a computer. As the cylindrical roller 40 rotates, each time the electronic optical device 56 detects the mark on the circumference of the end of the cylindrical roller 40 which signals the position of the reference point of measurement, the digital micrometer 50-52 is triggered to take a snapshot measurement of the thickness of the thin film band 10 which is stored in the electronic control and data acquisition system. The thickness measurement snapshots taken by the digital micrometer 50-52 are therefore synchronized with the signals of the electronic optical device 56.

To scan the entire width of the thin film band 10, the mobile platform 18 is moved laterally at constant speed along the rails 16 while the digital micrometer 50-52 takes a snapshot measurement of the thickness of the thin film band 10 every time the electronic optical device 56 detects the mark on the circumference of the end of the cylindrical roller 40. As the mobile platform 18 travels in one direction, it carries with it the cylindrical roller 40 and the digital micrometer 50-52, while the thin film band 10 remains substantially in the same position relative to the base 14 and therefore slides on the surface of the cylindrical roller 40 in the opposite direction as the cylindrical roller 40 is carried by the mobile platform 18. At the end of its course or when the digital micrometer 50-52 has scanned the entire surface of the thin film band 10 and its measurements now read 'zero', the mobile platform 18 starts moving back in the opposite direction and the digital micrometer 50-52 scans the surface of the thin film band 10 by taking a snapshot measurement of the thickness of the thin film band 10 every time the electronic optical device 56 detects the mark on the circumference of the end of the cylindrical roller 40.

Figure 6:
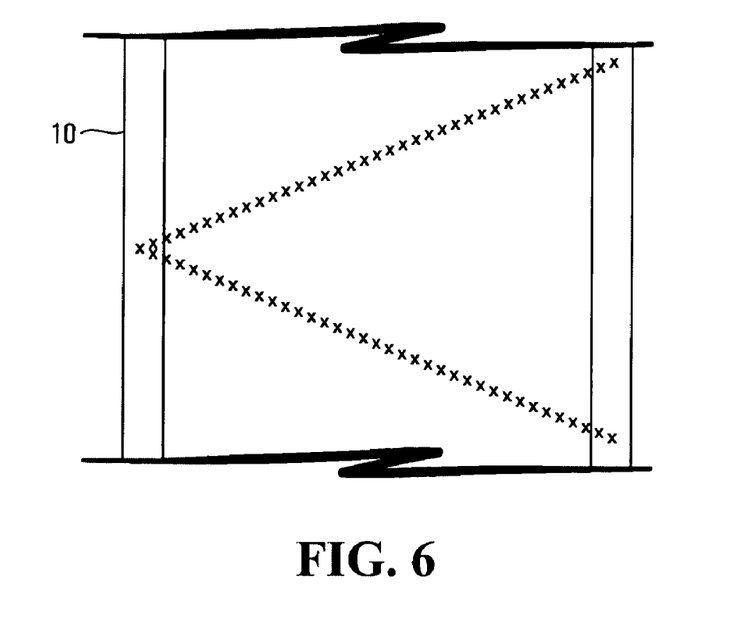
FIG. 6 is a schematic top plan view representing measurement points taken on a thin film.

FIG. 6 illustrates schematically points of thickness measurement X taken by the digital micrometer 50-52 along the length of the traveling thin film band 10. This distribution of thickness measurement points is related to the speed of the thin film band 10, the circumference of the cylindrical roller 40, and the speed of the mobile platform 18. The series of thickness measurements X taken in one direction provides an accurate picture of the thickness variation along the entire width of the thin film band 10.

Figure 7:
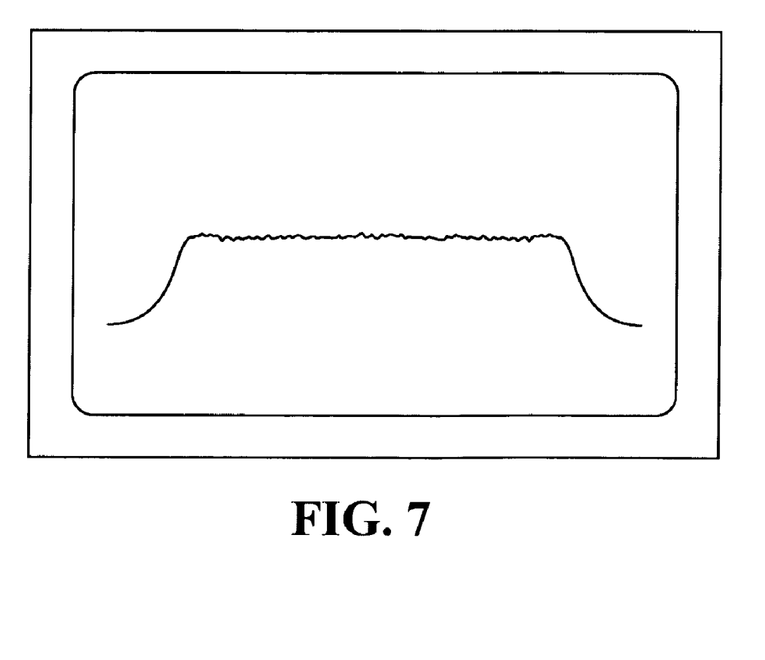
FIG. 7 is a diagrammatic front view of a computer screen showing an image rendering a profile of thickness of a thin film.

In a specific embodiment, the electronic control and data acquisition system stores this series of thickness measurements X taken in one direction, processes the stored data, and forms on screen an image of the profile of the thickness of the thin film band 10, as illustrated schematically in FIG. 7, whereby an operator monitoring the coating process of the composite electrode material 84 onto the aluminum foil 80 can visualize its thickness profile. Because the profile of the thickness of the thin film band 10 is updated on screen every time the width of the thin film band 10 is scanned, the operator can be warned of tendencies when, for example, the operator notices that the thickness of the thin film band 10 is increasing in a specific area of the profile and may make appropriate adjustments to counter the observed tendency.

As a possible variant, the electronic control and data acquisition system may be coupled to one or more devices (not shown) used in processing, including manufacturing, the thin film band 10 and located upstream and/or downstream of the apparatus 10 such as to automatically control the operation of the one or more devices based on the obtained thickness measurement data. In such a variant, the electronic control and data acquisition system may enforce a film thickness control logic that regulates the operating conditions of the devices used in processing the thin film band 10 such as to produce a desired thickness profile for the thin film band 10. The film thickness control logic uses as parameters the thickness measurements generated by the measurement unit 49 in order to adjust the operating conditions of the devices used in processing the thin film band 10.

With continued reference to FIGS. 1 to 4, when the thin film band 10 slides on the surface of the cylindrical roller 40 as the latter is carried by the mobile platform 18, a certain amount of friction occurs, depending on the material of the thin film band 10 and of the cylindrical roller 40, that may deform the traveling thin film band 10 which will not only distort the thickness measurements but may also damage the thin film band 10. To prevent the formation of ripples, waves or nicks on the thin film band 10 or even ripping or breaking of the thin film band 10 which could occur as a result of the friction caused by the lateral motion of the cylindrical roller 40, the apparatus 12 includes the swiveling platform 24 to which are mounted the cylindrical roller 40 and the digital micrometer 50-52, as previously described. As the mobile platform 18 initiates its lateral motion or just prior to initiation of that lateral motion, the swiveling platform 24 and therefore the cylindrical roller 40 are pivoted about the axis of rotation 30 to a specific angle θ relative to the mobile platform 18 either clockwise or counterclockwise depending on the direction of travel of the mobile platform 18. The value of the angle θ of the swiveling platform 24 is dependent on the speed of the mobile platform 18 during its lateral motion, the speed of the thin film band 10, and the coefficients of friction of the surface of the cylindrical roller 40 and of the surface of the thin film band 10 in contact with the cylindrical roller 40. The value of the angle θ of the swiveling platform 24 in both directions (clockwise and counterclockwise) is set by the adjustment screws 27 of the stoppers 25.

Figure 8:
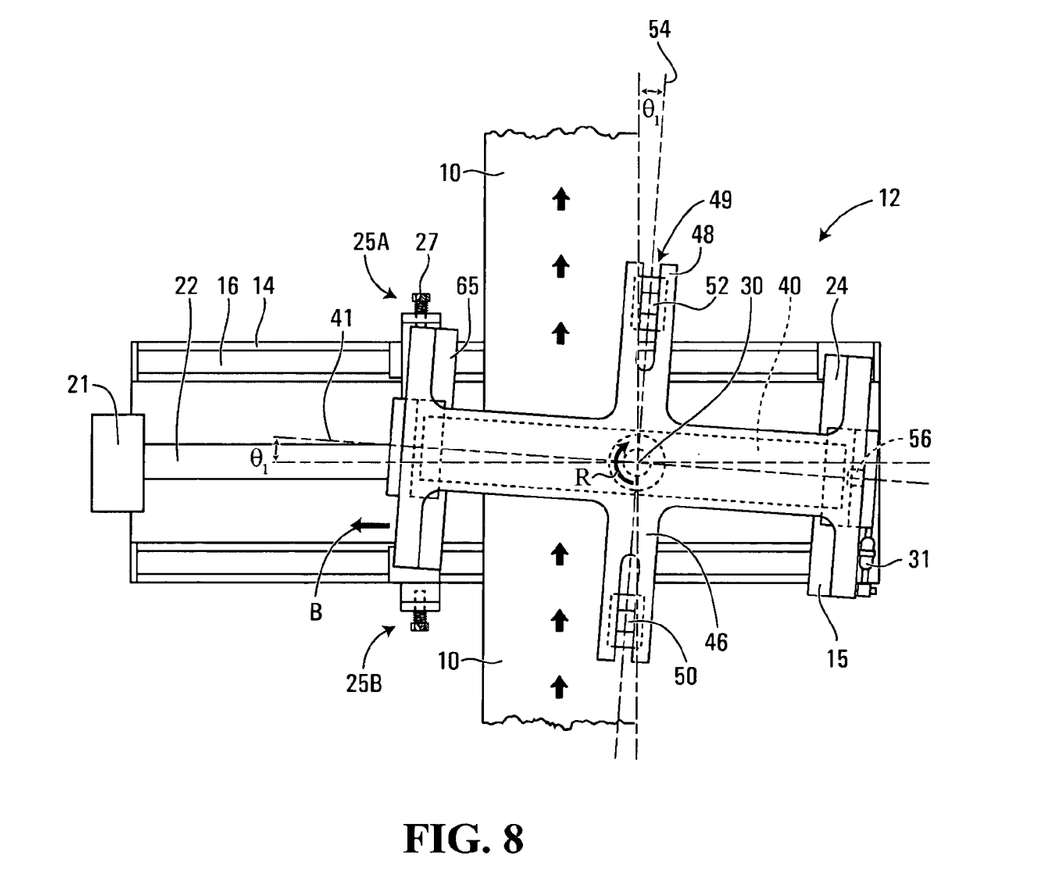
FIG. 8 is a schematic top plan view of the apparatus for measuring the thickness of a thin film, moving in one direction.

With reference to FIG. 8, when the mobile platform 18 initiates its lateral motion in the direction B or just prior to initiation of that lateral motion, the twin piston-cylinder assembly 31 causes the swiveling platform 24 to rotate clockwise about the axis of rotation 30, as illustrated by arrow R, until the corner 65 of the swiveling platform 24 abuts against the end of the adjustment screw 27 of the stopper 25A, thereby giving the axis of rotation 41 of the cylindrical roller 40 a nonzero angle $\theta_1$ relative to the direction of motion of the mobile platform 18 and an angle $(90°-\theta_1)$ relative to the direction of travel of the thin film band 10. The measuring plane 54 of the digital micrometer 50-52 is also rotated by the same angle $\theta_1$ relative to the direction of travel of the thin film band 10. The angle $\theta_1$ given to the cylindrical roller 40 prevents or at least inhibits formation of ripples, waves or nicks or rips and breakage of the thin film band 10 which could result from the friction caused by the lateral motion of the cylindrical roller 40. In effect, the angle $\theta_1$ given to the cylindrical roller 40 counters the lateral friction caused by the lateral motion of the cylindrical roller 40 by generating an opposite friction force between the thin film band 10 and the cylindrical roller 40 which induces the thin film band 10 to drift on the surface of the cylindrical roller 40 in the opposite direction of the lateral motion of the mobile platform 18, thereby maintaining the thin film band 10 in substantially the same position relative to the base 14. The angle $\theta_1$ given to the measuring plane 54 of the digital micrometer 50-52 has no effect on the measurements since the thickness measurements are still taken at the reference point of measurement defined above and at the same distance since the rotation of the swiveling platform 24 and of the cylindrical roller 40 is done about the axis of rotation 30 which in this case coincides with the reference point of measurement.

Figure 9:
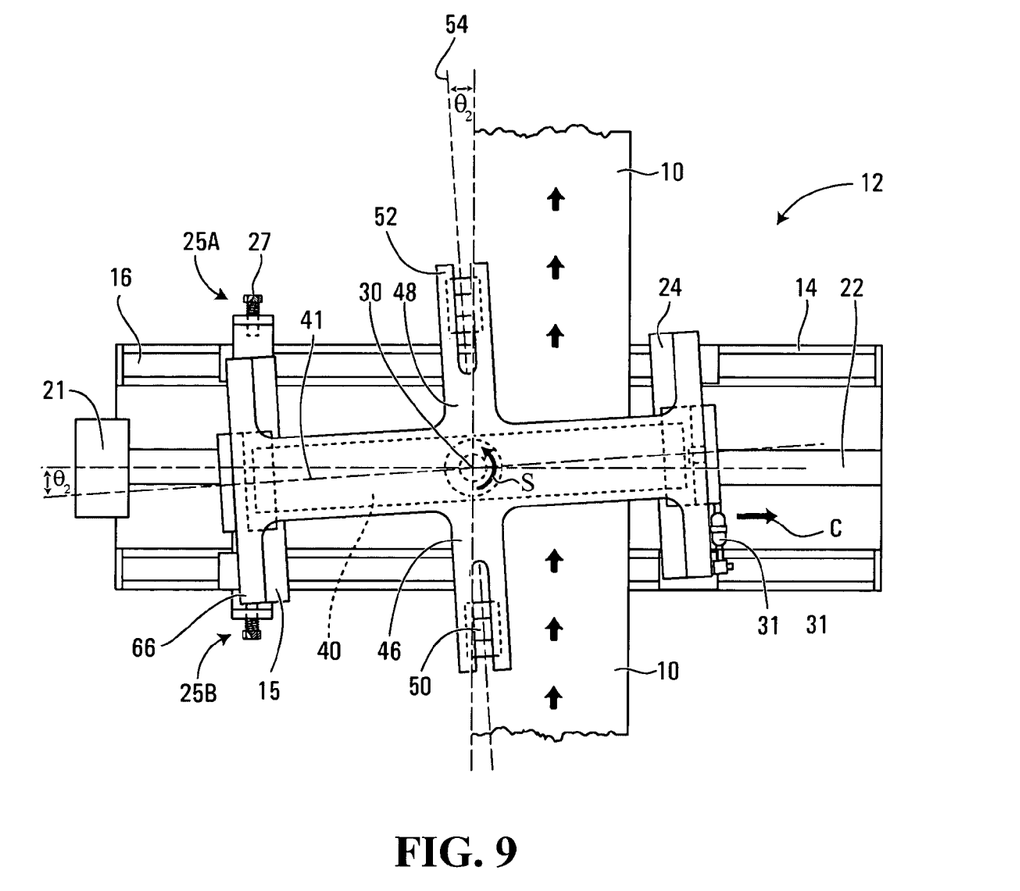
FIG. 9 is a schematic top plan view of the apparatus for measuring the thickness of a thin film, moving in another direction.

When the mobile platform 18 has reached the end of its course in the direction B or when the digital micrometer 50-52 has scanned the entire surface of the thin film band 10, the mobile platform 18 starts moving back in the opposite direction C as illustrated in FIG. 9. Prior to initiation of the lateral motion of the mobile platform 18 in the direction C or simultaneously thereto, the twin piston-cylinder assembly 31 causes the swiveling platform 24 to rotate counterclockwise about the axis of rotation 30, as illustrated by arrow S, until the corner 66 of the swiveling platform 24 abuts against the end of the adjustment screw 27 of the stopper 25B, thereby giving the axis of rotation 41 of the cylindrical roller 40 a nonzero angle $\theta_2$ relative to the direction of motion of the mobile platform 18 and an angle $(90°-\theta_2)$ relative to the direction of travel of the thin film band 10. The measuring plane 54 of the digital micrometer 50-52 is also rotated by the same angle $\theta_2$ relative to the direction of travel of the thin film band 10. The angle $\theta_2$ given to the cylindrical roller 40 prevents or at least inhibits formation of ripples, waves or nicks or rips and breakage of the thin film band 10 which could result from the friction caused by the lateral motion of the cylindrical roller 40 in the opposite direction C. As described above with reference to FIG. 8, the angle $\theta_2$ given to the cylindrical roller 40 counter-balances the lateral friction caused by the lateral motion of the cylindrical roller 40 by generating an opposite friction force between the thin film band 10 and the cylindrical roller 40 which induces the thin film band 10 to drift on the surface of the cylindrical roller 40 in the opposite direction of the lateral motion of the mobile platform 18, thereby maintaining the thin film band 10 in substantially the same position relative to the base 14. The digital micrometer 50-52 re-scans the surface of the thin film band 10 by taking snapshot thickness measurements along the direction C.

Advantageously, as will be appreciated by those skilled in the art, the entire process of thickness measurement by the digital micrometer 50-52, synchronization of the thickness measurement snapshots with the electronic optical device 56, as well as lateral motion of the mobile platform 18 and angular displacements of the swiveling platform 24 is automated through a simple sequence by the electronic control and data acquisition system.

While the invention has been described in relation to its use in electrode film assembly for electrochemical generators, the apparatus 12 and the process described herein may be adapted for a variety of thin film measurements where a high level of precision is required.

Although the invention has been described in relation to a particular embodiment, this was for the purpose of describing, but not limiting, the invention. Various modifications will become apparent to those skilled in the art and are within the scope of the present invention, which is defined more particularly by the attached claims.

The invention claimed is:

1. An apparatus for monitoring a thickness of a film in motion, said apparatus comprising:
    a roller for receiving and supporting the film in motion, said roller having a length and a surface, said roller being adapted to rotate about an axis of rotation;
    a position detector for detecting when said roller is in a specific angular position as said roller rotates about the axis of rotation; and
    a measurement unit aligned with a specific portion of said roller and coupled to said position detector, said measurement unit being responsive to a detection of said roller being in the specific angular position to measure the thickness of the film by measuring a distance between the surface of the roller and the surface of the film not in contact with the roller at the specific portion of said roller.

2. An apparatus as defined in claim 1, wherein the film travels in a first direction, said apparatus further comprising a support element, said roller and said measurement unit being mounted to said support element, said support element being movable in a second direction that is transverse to the first direction to enable said measurement unit to take a plurality of measurements of the thickness of the film, each of the measurements being taken responsive to a respective detection of said roller being in the specific angular position.

3. An apparatus as defined in claim 2, wherein said roller is movable to position its axis of rotation at a nonzero angle relative to the second direction, thereby limiting friction between said roller and the film when said support element moves in the second direction.

4. An apparatus as defined in claim 3, wherein said support element comprises a first part pivotally coupled to a second part, said roller and said measurement unit being mounted to said second part, said second part being pivotable relative to said first part to position the axis of rotation of said roller at the nonzero angle.

5. An apparatus as defined in claim 4, further comprising an actuator coupled to said first part and said second part, said actuator being operative to pivot said second part relative to said first part.

6. An apparatus as defined in claim 5, wherein said first part comprises a stopper, the axis of rotation being positioned at the nonzero angle when said second part abuts against said stopper.

7. An apparatus as defined in claim 2, further comprising an actuator coupled to said support element for moving said support element in the second direction.

8. An apparatus as defined in claim 2, further comprising at least one vibration absorbing element positioned within the support element and isolating said roller and said measurement unit to impede propagation of vibrations to said roller and said measurement unit.

9. An apparatus as defined in claim 1, wherein said roller comprises a detectable mark at a particular location on said roller, said position detector being operative to detect said detectable mark.

10. An apparatus as defined in claim 1, wherein said position detector comprises an electronic optical device operative to optically detect when said roller is in the specific angular position as said roller rotates about the axis of rotation.

11. An apparatus as defined in claim 1, wherein said measurement unit comprises a light emitter and a light detector, said light emitter being operative to interact with said light detector to optically measure the thickness of the film.

12. An apparatus as defined in claim 1, further comprising a control unit coupled to said position detector and said measurement unit, said measurement unit being coupled to said position detector via said control unit, said control unit being operative to: obtain from said position detector an indication of a detection of said roller being in the specific angular position; cause said measurement unit to measure the thickness of the film responsive to obtaining an indication of a detection of said roller being in the specific angular position; and obtain from said measurement unit data indicative of a measurement of the thickness of the film.

13. An apparatus as defined in claim 12, wherein said control unit is further operative to generate a control signal for controlling a device for processing the film by adjusting the thickness of the film based at least in part on the data indicative of a measurement of the thickness of the film.

14. An apparatus as defined in claim 12, wherein said control unit is further operative to cause displaying on a screen of the data indicative of a measurement of the thickness of the film.

15. A method for monitoring a thickness of a film in motion, said method comprising:
- receiving and supporting the film in motion on a roller having a length and a surface, said roller adapted to rotate about an axis of rotation;
- detecting when the roller is in a specific angular position as the roller rotates about the axis of rotation; and
- using a measurement unit aligned with a specific portion of the roller to measure the thickness of the film by measuring a distance between the surface of the roller and the surface of the film not in contact with the roller at the specific portion of said roller in response to a detection of the roller being in the specific angular position.

16. A method as defined in claim 15, wherein the film travels in a first direction, said method further comprising: moving the roller and the measurement unit in a second direction that is transverse to the first direction to enable the measurement unit to take a plurality of measurements of the thickness of the film, each of the measurements being taken responsive to a respective detection of the roller being in the specific angular position.

17. A method as defined in claim 16, said method further comprising: moving the roller to position the axis of rotation of the roller at a nonzero angle relative to the second direction, thereby limiting friction between the roller and the film when the roller moves in the second direction.

18. A method as defined in claim 15, further comprising providing at least one vibration absorbing element to impede propagation of vibrations to the roller and the measurement unit.

* * * * *